US007803055B2

(12) United States Patent
Hessie, Sr.

(10) Patent No.: US 7,803,055 B2
(45) Date of Patent: Sep. 28, 2010

(54) WALL-MOUNTABLE VIDEO GAME

(75) Inventor: David W. Hessie, Sr., Manchester, MD (US)

(73) Assignee: Columbia Amusement, Inc., Baltimore, MD (US)

(*) Notice: Subject to any disclaimer, the term of this patent is extended or adjusted under 35 U.S.C. 154(b) by 1381 days.

(21) Appl. No.: 10/883,605

(22) Filed: Jul. 1, 2004

(65) Prior Publication Data

US 2006/0003845 A1    Jan. 5, 2006

(51) Int. Cl.
  *A63F 9/24* (2006.01)
  *A63F 13/00* (2006.01)
(52) U.S. Cl. .............................. 463/46; 463/1
(58) Field of Classification Search ............. 463/16–20, 463/46, 1; 312/245–248, 249.1, 223.1, 352
See application file for complete search history.

(56) References Cited

U.S. PATENT DOCUMENTS 5,960,653 A * 10/1999 DeWalch et al. .............. 70/164
5,974,551 A * 10/1999 Lee ............................. 713/300
6,755,493 B1 * 6/2004 Krietzman et al. ........... 312/248
6,896,259 B2 * 5/2005 Sines et al. ............. 273/121 B
7,267,613 B2 * 9/2007 Cole ........................... 463/20

\* cited by examiner

*Primary Examiner*—Dmitry Suhol
*Assistant Examiner*—Robert Mosser
(74) *Attorney, Agent, or Firm*—Hodes, Pessin & Katz, P.A.

(57) ABSTRACT

A wall mounted video game has a cabinet. A relatively thin monitor is received in the upper portion of the cabinet. The lower portion of the cabinet is deeper than the upper portion. Manual controls are set in the lower portion. The cabinet has a back hingedly connected to the body of the cabinet. The back of the cabinet is mounted on the wall and the cabinet is locked in a closed position mounted on the wall. Circuitry for the video game is connected to the back of the cabinet and is in the interior of the cabinet, connected by an electrical harness to the controls and the monitor.

5 Claims, 5 Drawing Sheets

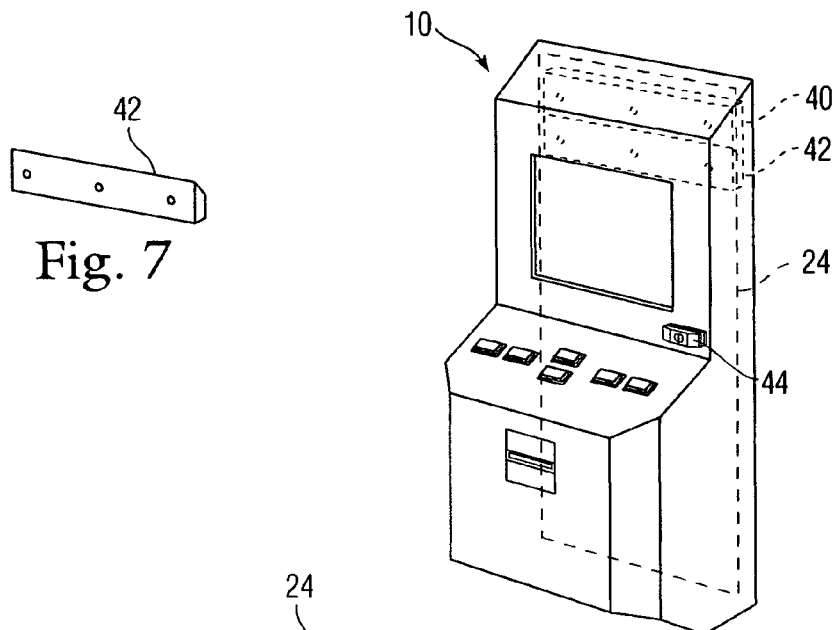
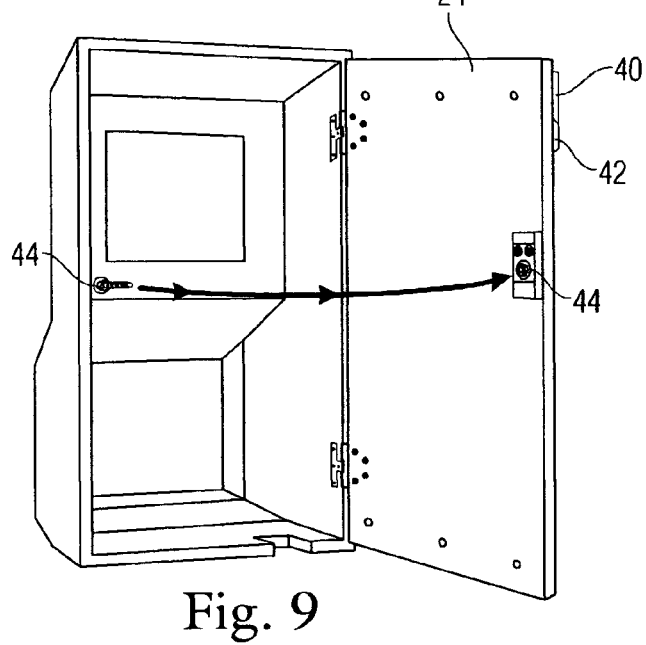
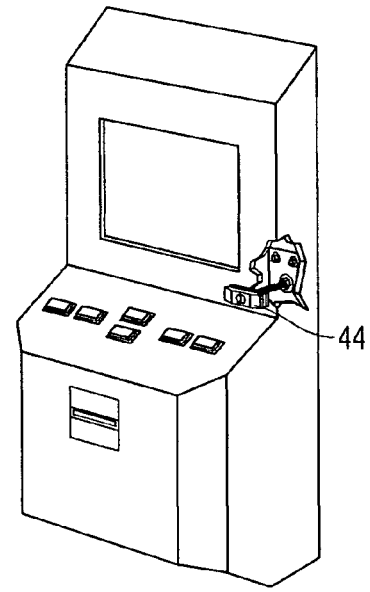
Fig. 7
Fig. 8
Fig. 9
Fig. 10

WALL-MOUNTABLE VIDEO GAME

BACKGROUND OF THE INVENTION

1. Field of the Invention

This invention relates to video games and more particularly to a compact game which occupies a much smaller space and has readily accessible components.

2. Description of Related Art

The presently available video games are relatively large and bulky and occupy much floor space in a game arcade or other location. Part of the bulk is due to monitors with picture tubes and associated cabinetry. The conventional monitor has a depth of 15 to 20 inches.

BRIEF SUMMARY OF THE INVENTION

The present invention uses a Liquid Crystal Display (LCD) monitor which is only two inches in depth. Any type of video game can be housed in the cabinet of the present invention.

It is an object of the present invention to provide a compact video game which occupies significantly less space than video games currently available.

It is a further object of the present invention to provide a video game which is mounted on a building structure.

It is still another object of the present invention to provide a video game which has a hinged cabinet for easy access to the interior of the cabinet.

In accordance with the teachings of the present invention, there is disclosed a wall-mounted video game, comprising a cabinet including an upper portion housing a relatively-thin monitor and further including a lower portion having the controls to be manipulated by a player. The cabinet further includes a main body and a door hinged thereto. The door is anchored to a wall in a video arcade or other establishment, such that the video game takes up a minimum of floor space in the arcade while being convenient and comfortable for the player.

In further accordance with the teachings of the present invention, there is disclosed a compact video game intended for an arcade or other establishment in a building structure, wherein floor space is at a premium. The video game has a cabinet having a main body hinged to a door anchored to the building structure. A lock is disposed between the main body and the door. The main body has a relatively-thin video monitor mounted thereon. The door has circuitry mounted thereon internally of the cabinet and a flexible harness is disposed between the circuitry and the video monitor.

These and other objects of the present invention will become apparent from a reading of the following specification taken in conjunction with the enclosed drawings.

BRIEF DESCRIPTION OF THE DRAWINGS

FIG. 7 is a perspective view of a panel attached to a wall.

FIG. 8 is a perspective view of the video game of the present invention being set on the wall mounted panel of FIG. 7.

FIG. 9 is a perspective view of the cabinet being open and the back of the cabinet being secured to the wall mounted panel.

FIG. 10 is a perspective view of a front of the cabinet mounted on the wall.

DESCRIPTION OF THE PREFERRED EMBODIMENTS

Figures 1, 2:
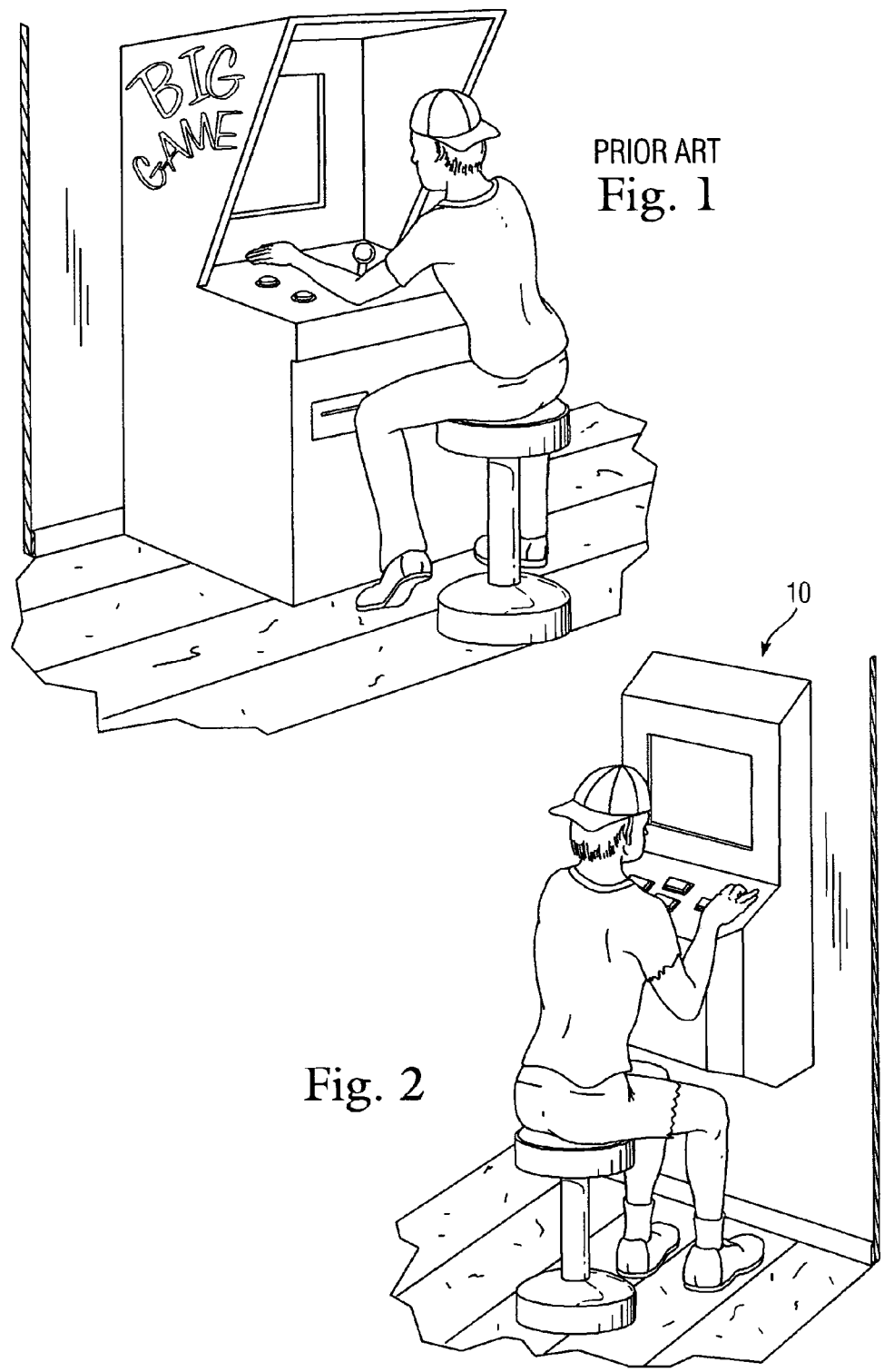
FIG. 1 is a perspective view of a player using a video game of the prior art.
FIG. 2 is a perspective view of a person using a video game of the present invention.

Referring now to the drawings, FIG. 1 shows the prior art. The video game has a picture tube in the upper portion to display the game. The device is relatively large and occupies much floor space in a game arcade or other location.

As seen in FIGS. 2-5, the video game 10 of the present invention is a compact device which has a cabinet having an upper portion 12, a stepped lower portion 14, a right side 16, a left side 18, a top ledge 20, a bottom 22 and a back 24. Preferably, the lower portion 14 has a top ledge 28 which is slanted forwardly at an acute angle. Manually manipulated controls 30 are disposed on the slanted ledge 28. The controls 30 may be a plurality of push buttons. The lower portion 14 has a bottom ledge 32 which is rearwardly slanted downwardly at an acute angle. When the video game is mounted on a wall, as will be described, the rearwardly slanted bottom ledge 32 provides space for the player to be seated in front of the game 10 such that the player's knees are below the bottom ledge 32. The player is close enough to the video game 10 to comfortably operate the controls 30 while occupying a minimum amount of space. The overall depth of the lower portion 14, at its deepest dimension, is approximately twelve (12) inches.

The upper portion 12 of the cabinet has a top ledge 20 which is slanted forwardly. In the upper portion of the front of the cabinet there is a monitor 34 for the player to view the game. The monitor 34 in the present invention is a compact liquid crystal display (LCD) which is approximately two (2) inches in depth as compared to a conventional picture tube monitor which is approximately 15-20 inches in depth. The overall depth of the upper portion 12 of the cabinet is approximately six (6) inches. It is preferred that a break-resistant plastic shield 36 be mounted in front of the monitor 34 to prevent damage to the monitor 34.

Figure 6:
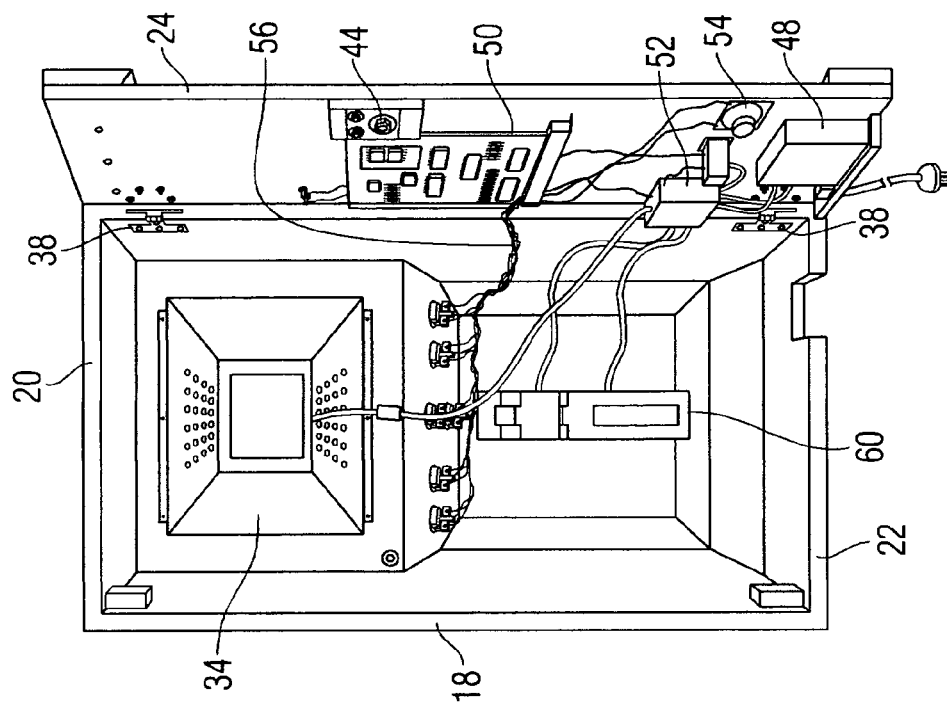
FIG. 6 is a perspective view of the opened back of the present invention showing the monitor in the upper section connected by a cable harness to components mounted on the back of the cabinet.
Figure 5:
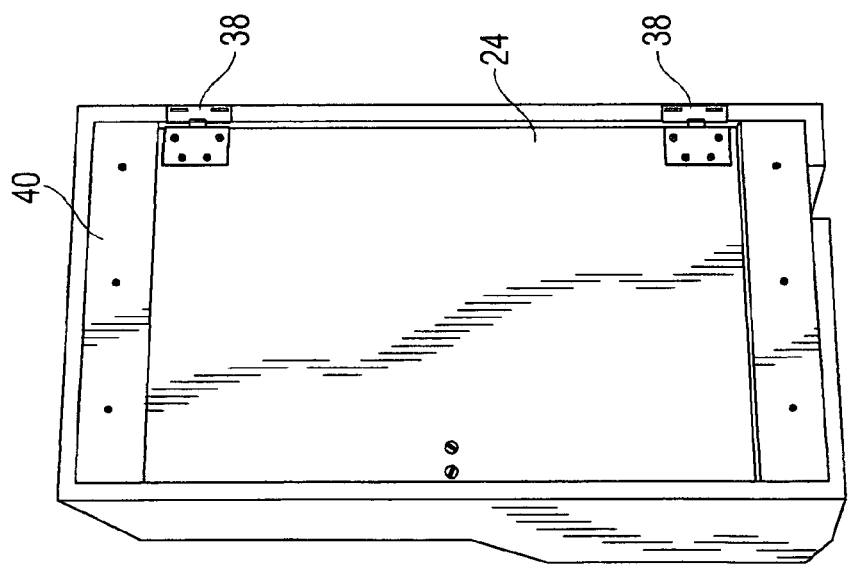
FIG. 5 is a back elevation view of the video game of the present invention.
Figure 11:
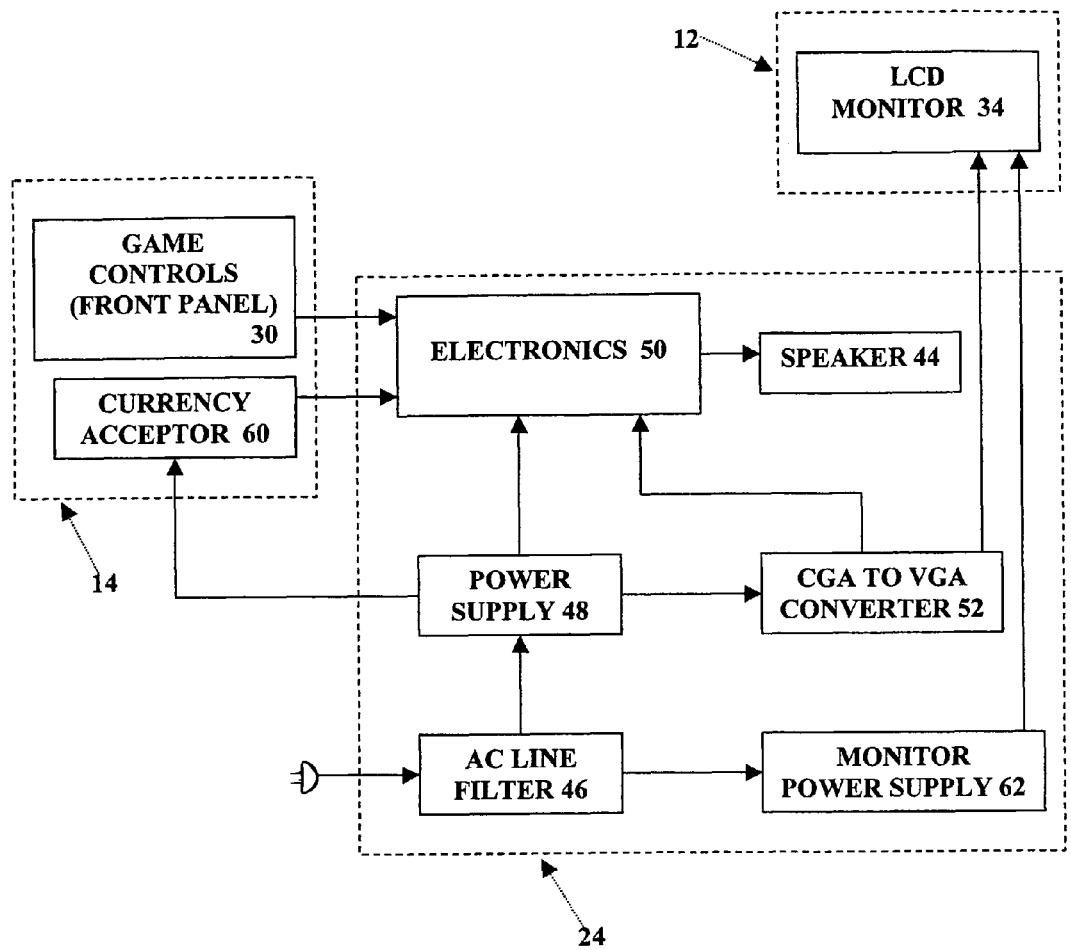
FIG. 11 is a block diagram of the present invention.

The back of the cabinet is attached to the side 16 of the cabinet by hinges (FIGS. 5 and 6). Preferably, the back 24 of the cabinet is secured to a vertical wall in the arcade or room in which the video game is to be played. As shown in FIGS. 7-10, one method of securing the cabinet to the wall is by a French cleat. Exteriorly, at the top of the back 24, a first panel 40 is connected. The first panel extends the width of the back 24. The bottom edge of the first panel, distal from the back 24, is beveled upwardly at an angle of approximately 45° across the entire width of the panel. A corresponding second panel 42, having an upper edge beveled at approximately 45° is mounted on the wall such that the beveled edge extends upwardly distal from the wall. The cabinet is placed against the wall and lowered until the upward facing 45° edge on the second panel 42 cooperates with the downward facing 45° edge on the first panel 40 connected to the back 24 of the cabinet. Fasteners such as screws are then connected to the inner face of the back 24 of the cabinet such that the fasteners firmly secure together the back 24 of the cabinet and the second panel 42 mounted on the wall. The entire cabinet of the video game 10 is supported against the wall in this manner.

The above describes a preferred method of mounting the cabinet to the wall. Other methods known to persons skilled in the art may be used. Also, the cabinet may be mounted on legs or be free standing if desired.

As noted above, the back 24 of the cabinet is hinged to the side of the cabinet in the manner of a door. A lock means 44 connects the back 24 of the cabinet to the body of the cabinet. The lock means may be a threaded shaft mounted in the body of the cabinet which is received in a cooperating threaded receiver on the back of the cabinet. A key or similar locking device secures the threaded shaft. Thus, when the cabinet is locked, access is prevented to the back of the cabinet and it is not possible to remove the cabinet from the second panel 42 which is attached to the wall. As a result the video game of the present invention is permanently hung on the wall and can be removed only when the lock means 44 is opened and the fasteners removed from the inside of the back 24.

Also, the circuitry to operate the video game 10 is mounted internally on the back 24 (FIG. 6) and is inaccessible without having access to the key to the lock means 44. The circuitry includes a filter 46, a power supply 48, a game pc board 50, a converter 52, an audio speaker 54 and a monitor power supply 62. A flexible electrical harness 56 connects the circuitry mounted on the back 24 with the monitor 34 and the controls 30. The converter 52 converts Color Graphics Adapter (CGA) to Video Graphics Array (VGA) which uses analog signals and has greater resolution and more colors.

Figure 3:
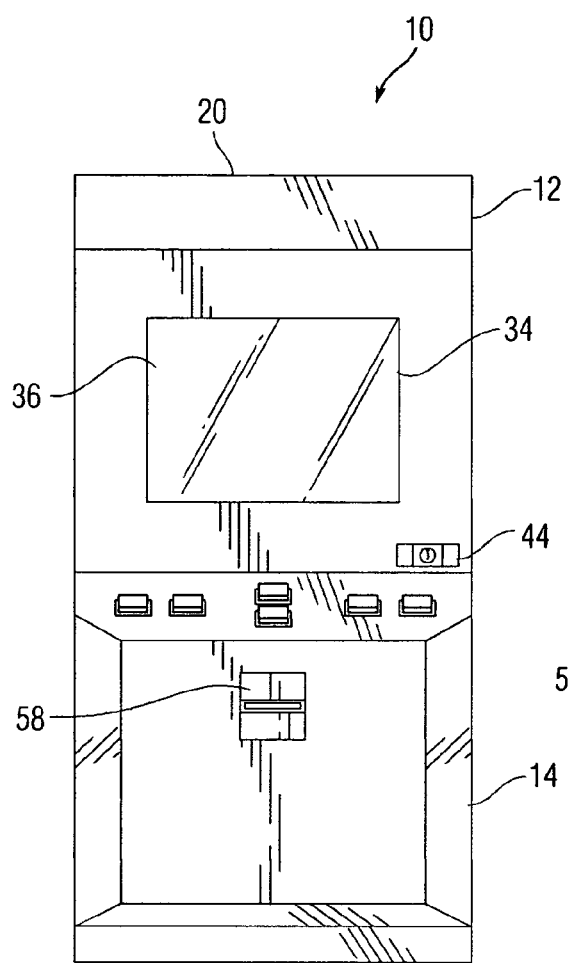
FIG. 3 is a front elevation view of the video game of the present invention.
Figure 4:
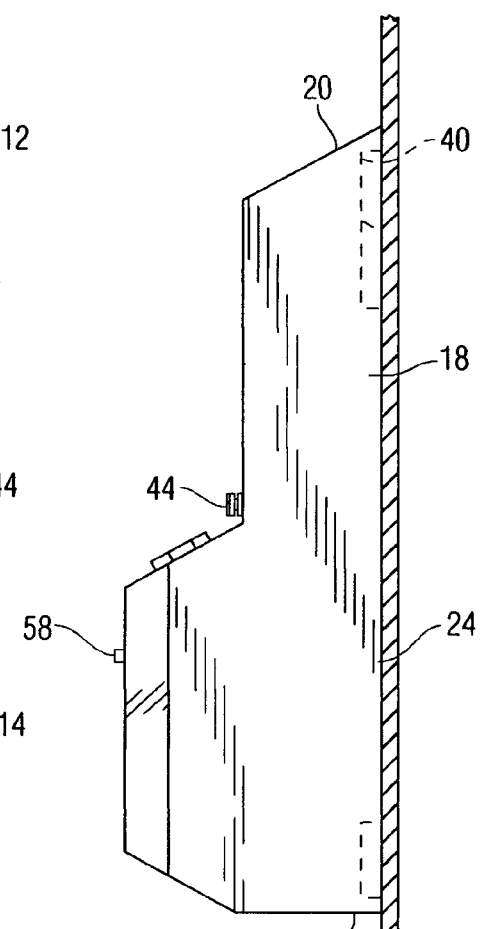
FIG. 4 is a side elevation view of the wall-mounted video game of the present invention.

As shown in FIG. 3, a currency acceptor 58 is mounted on the front of the body of the video game 10, preferably on the lower portion 14. The currency acceptor 58 may be set to receive coins, chips, vouchers or paper currency. For paper currency, a stacking receptacle 60 is mounted interiorly of the cabinet aligned with the currency receptor 58. The currency acceptor 58 is electrically connected to the circuitry such that the video game is activated when the predetermined currency is deposited in the currency receptor 58 by a player of the game.

Obviously, many modifications may be made without departing from the basic spirit of the present invention. Accordingly, it will be appreciated by those skilled in the art that within the scope of the appended claims, the invention may be practiced other than has been specifically described herein.

The invention claimed is:

1. A wall-mounted video game, comprising a cabinet including an upper portion housing a relatively-thin monitor and further including a lower portion having the controls to be manipulated by a player, the cabinet further including a main body having a front and a back, a single separate door hingedly connected to the back of the main body, the door being anchored to a wall in a video arcade or other establishment, thereby taking up a minimum of floor space in the arcade while being convenient and comfortable for a player;

circuitry for operation of the video game being mounted internally on the door, providing access to the circuitry when the main body of the cabinet is swung outwardly from the door;

the circuitry having a converter to convert color graphics adapter (CGA) to video graphics array (VGA);

locking means extending from the front of the main body to the door anchored to the wall, a key being provided to unlock the locking means, the locking means securing the main body to the door and preventing removal of the cabinet from the wall, the locking means preventing access to the circuitry.

2. The wall-mounted video game of claim 1, wherein the locking means has a handle on the front of the main body, the handle being connected to a shaft extending from the front of the main body to the door, the shaft having an end cooperating with a receiving means in the door.

3. The wall-mounted video game of claim 1, wherein the cabinet is stepped in side profile, such that the upper portion of the cabinet is thinner than the lower portion thereof, the lower portion of the stepped cabinet having a ledge which is slanted rearwardly downwardly at an acute angle, and wherein space is provided beneath the wall-mounted video game so a player may be comfortably seated in front of the video game.

4. The wall-mounted video game of claim 1, wherein the circuitry comprises a filter, a power supply game pc board, a CGA converter, an audio speaker and a monitor power supply.

5. A wall-mounted video game, comprising a cabinet including an upper portion housing a relatively-thin monitor and further including a lower portion having the controls to be manipulated by a player, the cabinet further including a main body having a front and a back, a single separate door hingedly connected to the back of the main body, the separate door being anchored to a wall in a video arcade or other establishment, thereby taking up a minimum of floor space in the arcade while being convenient and comfortable for the player;

wherein circuitry for operation of the video game is mounted internally on the door, the circuitry comprising a filter, a power supply, a game pc board, a converter to convert GCA to VGA, an audio speaker, and a monitor power supply, access to the circuitry being provided only when the main body of the cabinet is swung outwardly from the door;

locking means having a handle on the front of the main body, the handle being connected to a shaft extending from the front of the main body to a cooperating receiver in the door anchored to the wall, a key being provided to unlock the locking means, the locking means securing the main body to the door and preventing removal of the cabinet from the wall, the locking means providing access to the circuitry mounted internally on the door;

wherein the cabinet is stepped in side profile, such that the upper portion of the cabinet is thinner than the lower portion thereof; and wherein the lower portion of the stepped cabinet has a ledge which is rearwardly slanted downwardly at an acute angle, and wherein space is provided beneath the wall mounted game so a player may be comfortably seated in front of the video game.

* * * * *